(12) United States Patent
Luo et al.

(10) Patent No.: US 10,771,273 B2
(45) Date of Patent: Sep. 8, 2020

(54) NETWORK INFORMATION FOR ASSISTING USER EQUIPMENT

(71) Applicant: QUALCOMM Incorporated, San Diego, CA (US)

(72) Inventors: Tao Luo, San Diego, CA (US); Yongbin Wei, San Diego, CA (US); Peter Gaal, San Diego, CA (US); Hao Xu, San Diego, CA (US); Taesang Yoo, Riverside, CA (US); Siddhartha Mallik, San Diego, CA (US); Makesh Pravin John Wilson, San Diego, CA (US); Naga Bhushan, San Diego, CA (US); Durga Prasad Malladi, San Diego, CA (US); Tingfang Ji, San Diego, CA (US); Gavin Bernard Horn, La Jolla, CA (US); Alexei Y. Gorokhov, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 349 days.

(21) Appl. No.: 15/439,864

(22) Filed: Feb. 22, 2017

(65) Prior Publication Data

US 2017/0163433 A1 Jun. 8, 2017

Related U.S. Application Data

(63) Continuation of application No. 13/920,036, filed on Jun. 17, 2013, now abandoned, and a
(Continued)

(51) Int. Cl.
*H04L 12/18* (2006.01)
*H04W 16/14* (2009.01)
(Continued)

(52) U.S. Cl.
CPC ......... *H04L 12/189* (2013.01); *H04B 7/0452* (2013.01); *H04B 7/0632* (2013.01);
(Continued)

(58) Field of Classification Search
CPC ...... H04B 1/126; H04B 7/024; H04B 7/0413; H04B 7/0452; H04B 7/0631;
(Continued)

(56) References Cited

U.S. PATENT DOCUMENTS

| 6,782,037 B1 | 8/2004 | Krishnamoorthy et al. |
| 8,149,760 B2 | 4/2012 | So et al. |

(Continued)

FOREIGN PATENT DOCUMENTS

| CN | 1283005 A | 2/2001 |
| CN | 101035254 A | 9/2007 |

(Continued)

OTHER PUBLICATIONS

Klaus Kopsa et al: "Multiuser Space-Time Algorithms for Synchronization, Channel Estimation, and Data Detection in an Interference Monitoring System for UMTS/TDD Networks", IEEE Transactions on Communications, IEEE Service Center, Piscataway, NJ, US,vol. 55, No. 10,Oct. 1, 2007 (Oct. 1, 2007), pp. 1973-1983, XP011194612.

(Continued)

*Primary Examiner* — Khoa Huynh
(74) *Attorney, Agent, or Firm* — Arent Fox, LLP and Qualcomm, Incorporated

(57) ABSTRACT

A method, an apparatus, and a computer program product for wireless communication are provided. The apparatus may be a UE that acquires information regarding an interfering non-serving cell and uses the information to improve decoding of serving cell signals. The method includes receiving, from a serving evolved Node B (eNB), information that includes one or more transmission characteristics of
(Continued)

at least one non-serving cell and performing at least one of interference cancellation, demodulation, or provides an improved channel quality indicator (CQI) based on the received information.

53 Claims, 10 Drawing Sheets

Related U.S. Application Data continuation-in-part of application No. 14/991,874, filed on Jan. 8, 2016, now Pat. No. 10,027,372, which is a continuation of application No. 12/763,836, filed on Apr. 20, 2010, now Pat. No. 9,264,097.

(60) Provisional application No. 61/661,735, filed on Jun. 19, 2012, provisional application No. 61/184,670, filed on Jun. 5, 2009, provisional application No. 61/184,206, filed on Jun. 4, 2009.

(51) Int. Cl.
| | |
|---|---|
| H04B 7/06 | (2006.01) |
| H04W 72/08 | (2009.01) |
| H04L 5/00 | (2006.01) |
| H04L 1/00 | (2006.01) |
| H04B 17/336 | (2015.01) |
| H04B 7/0452 | (2017.01) |
| H04B 7/0413 | (2017.01) |

(52) U.S. Cl.
CPC ......... *H04B 17/336* (2015.01); *H04L 1/0026* (2013.01); *H04L 1/0075* (2013.01); *H04L 5/0035* (2013.01); *H04L 5/0048* (2013.01); *H04L 5/0057* (2013.01); *H04L 5/0073* (2013.01); *H04W 16/14* (2013.01); *H04W 72/082* (2013.01); *H04B 7/0413* (2013.01); *H04L 1/0067* (2013.01); *H04L 5/0044* (2013.01); *H04L 5/0053* (2013.01); *H04L 5/0091* (2013.01)

(58) Field of Classification Search
CPC ... H04B 17/336; H04B 7/0632; H04L 1/0026; H04L 1/0041; H04L 1/0067; H04L 1/0075; H04L 5/0035; H04L 5/0044; H04L 5/0048; H04L 5/0053; H04L 5/0057; H04L 5/0073; H04L 5/0091; H04L 12/189; H04W 16/14; H04W 28/02; H04W 48/16; H04W 72/082; H04W 72/085
See application file for complete search history.

(56) References Cited

U.S. PATENT DOCUMENTS

| | | | |
|---|---|---|---|
| 8,274,959 B2 | 9/2012 | Lee et al. | |
| 8,532,066 B2 | 9/2013 | Fernandez-Corbaton et al. | |
| 8,625,601 B2 | 1/2014 | Gholmieh et al. | |
| 8,781,400 B2 | 7/2014 | Lindoff et al. | |
| 9,374,719 B2 | 6/2016 | Xu et al. | |
| 9,426,673 B2 | 8/2016 | Chen et al. | |
| 9,628,214 B2 | 4/2017 | Luo et al. | |
| 9,723,497 B2 | 8/2017 | Xu et al. | |
| 2002/0027957 A1 | 3/2002 | Paulraj et al. | |
| 2002/0136187 A1 | 9/2002 | Aoyama et al. | |
| 2003/0012308 A1 | 1/2003 | Sampath et al. | |
| 2003/0123470 A1 | 7/2003 | Kim et al. | |
| 2003/0210782 A1 | 11/2003 | Dick et al. | |
| 2004/0181569 A1 | 9/2004 | Attar et al. | |
| 2005/0220211 A1 | 10/2005 | Shim et al. | |
| 2006/0013161 A1* | 1/2006 | Suzuki | H04L 1/0041 370/328 |
| 2006/0056501 A1 | 3/2006 | Shinoi et al. | |
| 2007/0041404 A1 | 2/2007 | Palanki et al. | |
| 2007/0105592 A1 | 5/2007 | Kang et al. | |
| 2007/0183544 A1 | 8/2007 | Lee et al. | |
| 2007/0190945 A1* | 8/2007 | Lee | H04B 1/126 455/63.1 |
| 2008/0037409 A1 | 2/2008 | Ogawa et al. | |
| 2008/0045215 A1 | 2/2008 | Chen et al. | |
| 2008/0096557 A1 | 4/2008 | Rinne et al. | |
| 2008/0268856 A1 | 10/2008 | Francalanci et al. | |
| 2009/0109939 A1 | 4/2009 | Bhushan et al. | |
| 2009/0175179 A1 | 7/2009 | Stewart et al. | |
| 2009/0233598 A1 | 9/2009 | Fukuoka et al. | |
| 2009/0264077 A1 | 10/2009 | Damnjanovic | |
| 2009/0279469 A1 | 11/2009 | Wang et al. | |
| 2009/0310715 A1 | 12/2009 | Cairns et al. | |
| 2010/0014660 A1 | 1/2010 | Kishiyama et al. | |
| 2010/0034314 A1 | 2/2010 | Brown et al. | |
| 2010/0069073 A1 | 3/2010 | Chen et al. | |
| 2010/0085913 A1 | 4/2010 | Subrahmanya | |
| 2010/0254301 A1* | 10/2010 | Blankenship | H04W 72/085 370/315 |
| 2010/0260052 A1 | 10/2010 | Cho et al. | |
| 2010/0296463 A1 | 11/2010 | Taoka et al. | |
| 2010/0309861 A1 | 12/2010 | Gorokhov et al. | |
| 2011/0026480 A1* | 2/2011 | Kim | H04B 7/0413 370/329 |
| 2011/0080864 A1 | 4/2011 | Cai et al. | |
| 2011/0201311 A1* | 8/2011 | Lee | H04W 48/16 455/411 |
| 2011/0211555 A1 | 9/2011 | Cohn | |
| 2011/0255486 A1 | 10/2011 | Luo et al. | |
| 2012/0021738 A1 | 1/2012 | Koo et al. | |
| 2012/0082022 A1 | 4/2012 | Damnjanovic et al. | |
| 2012/0088539 A1 | 4/2012 | Jeong et al. | |
| 2012/0099434 A1 | 4/2012 | Sun et al. | |
| 2012/0099669 A1 | 4/2012 | Gorokhov et al. | |
| 2012/0122440 A1 | 5/2012 | Krishnamurthy et al. | |
| 2012/0207040 A1 | 8/2012 | Comsa et al. | |
| 2013/0033998 A1 | 2/2013 | Seo et al. | |
| 2013/0039268 A1 | 2/2013 | Blankenship et al. | |
| 2013/0044697 A1 | 2/2013 | Yoo et al. | |
| 2013/0084865 A1 | 4/2013 | Agrawal et al. | |
| 2013/0136095 A1 | 5/2013 | Nishio et al. | |
| 2013/0223409 A1 | 8/2013 | Jung et al. | |
| 2013/0260712 A1 | 10/2013 | Deb et al. | |
| 2013/0272215 A1* | 10/2013 | Khoryaev | H04W 28/02 370/329 |
| 2013/0286849 A1 | 10/2013 | Park | |
| 2013/0301467 A1 | 11/2013 | Kang et al. | |
| 2013/0301542 A1 | 11/2013 | Krishnamurthy et al. | |
| 2013/0301608 A1 | 11/2013 | Frenne et al. | |
| 2013/0303153 A1 | 11/2013 | Bontu et al. | |
| 2013/0308503 A1 | 11/2013 | Kim et al. | |
| 2013/0329636 A1 | 12/2013 | Jiang et al. | |
| 2013/0336193 A1 | 12/2013 | Luo et al. | |
| 2013/0343317 A1* | 12/2013 | Etemad | H04B 7/024 370/329 |
| 2014/0016596 A1 | 1/2014 | Kim et al. | |
| 2014/0146767 A1 | 5/2014 | Choi et al. | |
| 2014/0204857 A1 | 7/2014 | Mallik et al. | |
| 2014/0219115 A1 | 8/2014 | Etemad et al. | |
| 2014/0226609 A1 | 8/2014 | Hooli et al. | |
| 2014/0247775 A1 | 9/2014 | Frenne et al. | |
| 2015/0092653 A1 | 4/2015 | Frenger et al. | |
| 2015/0092705 A1 | 4/2015 | Somasundaram | |
| 2015/0222304 A1 | 8/2015 | Xu et al. | |
| 2016/0119022 A1 | 4/2016 | Gorokhov et al. | |

FOREIGN PATENT DOCUMENTS

| | | |
|---|---|---|
| CN | 101208881 A | 6/2008 |
| EP | 1881621 A1 | 1/2008 |
| JP | 2001509988 A | 7/2001 |
| JP | 2001339758 A | 12/2001 |
| JP | 2003174400 A | 6/2003 |

(56) References Cited

FOREIGN PATENT DOCUMENTS

| | | | |
|---|---|---|---|
| JP | 2004511141 A | 4/2004 | |
| JP | 2006141047 A | 6/2006 | |
| JP | 2007300384 A | 11/2007 | |
| JP | 2008092379 A | 4/2008 | |
| JP | 2008193340 A | 8/2008 | |
| JP | 2009501484 A | 1/2009 | |
| JP | 2009089188 A | 4/2009 | |
| JP | 2009100116 A | 5/2009 | |
| JP | 2009111781 A | 5/2009 | |
| JP | 2009542066 A | 11/2009 | |
| JP | 2010506486 A | 2/2010 | |
| JP | 2010532589 A | 10/2010 | |
| JP | 2012504894 A | 2/2012 | |
| JP | 2013545396 A | 12/2013 | |
| TW | 200718051 | 6/2006 | |
| TW | 200742308 | 11/2007 | |
| WO | 9834367 A1 | 8/1998 | |
| WO | 03096694 A1 | 11/2003 | |
| WO | 2004066547 A1 | 8/2004 | |
| WO | 2007008036 A2 | 1/2007 | |
| WO | 07019555 | 2/2007 | |
| WO | 2007037008 A1 | 4/2007 | |
| WO | 2007147810 A1 | 12/2007 | |
| WO | 08022329 | 2/2008 | |
| WO | 2008054141 A1 | 5/2008 | |
| WO | 2008106317 A1 | 9/2008 | |
| WO | 09052363 | 4/2009 | |
| WO | 2010003034 A1 | 1/2010 | |
| WO | 2010038999 | 4/2010 | |
| WO | 2010085268 A1 | 7/2010 | |
| WO | 2011057296 A2 | 5/2011 | |
| WO | 2012006085 A1 | 1/2012 | |
| WO | 2012032726 A1 | 3/2012 | |
| WO | 2012060655 A2 | 5/2012 | |

OTHER PUBLICATIONS

Wu C-C et al: "Intercell interference cancellation for TD-CDMA mobile systems" Electronics Letters, IEE Stevenage, GB LNKD—DOI:10.1049/EL:20001381, vol. 36, No. 9 Nov. 9, 2000 (Nov. 9, 2000), pp. 1960-1961, XP006015935.
Xue P., et al., "Improved Multi-Cell Joint Channel Estimation for TD-SCDMA Downlink," Vehicular Technology Conference, 2008. VTC Spring 2008, IEEE, IEEE, Piscataway, NJ, USA, May 11, 2008. (May 11, 2008), pp. 1458-1462, XP031255807.
ETSI MCC: "Draft Report of 3GPP RAN Workshop on Release 12 and Onwards", 3GPP Draft; RWS-120XXX Draft Report_RAN REL12_Workshop 120507, 3rd Generation-Partnership Project (3GPP), Mobile Competence Centre; 650, Route Des Lucioles ; F-06921, Sophia-Antipolis Cedex ; =France, No. Ljubljana, Slovenia; Jun. 11, 2012-Jun. 12, 2012, May 7, 2012 (May 7, 2012), XP050647939, [retrieved on May 7, 2012], pp. 11, 12.
International Search Report and Written Opinion—PCT/US2013/046278—ISA/EPO—dated Sep. 11, 2013.
Qualcomm Incorporated: "Resource Allocation Methods for NCT", 3GPP Draft; R1-122876 Resource Allocation Methods for NCT, 3rd Generation Partnership Project (3GPP), Mobile Competence Centre ; 650, Route Des Lucioles ; F-06921 Sophia-Antipolis Cedex ; France, vol. RAN WG1, No. Prague; May 21, 2012-May 25, 2012, May 16, 2012 (May 16, 2012), XP050601132, [retrieved on May 16, 2012].
Ipwireless Inc: "Review of Approaches for Bandwidth Reduction for Low Complexity MTC LTE UES," 3GPP Draft; R1-114267, 3rd Generation Partnership Project (3GPP), Mobile Competence Centre ; Sophia-Antipolis Cedex ; France, vol. RAN WG1, No. San Francisco, USA; Nov. 14, 2011-Nov. 18, 2018, Nov. 9, 2011 (Nov. 9, 2011), 5 Pages, XP050562333, [retrieved on Nov. 11, 2011].
LG Electronics: "Discussions on Synchronized New Carrier Type", 3GPP TSG-RAN WG1#69, R1-122276, URL: http://www.3gpp.org/ftp/tsg_ran/WG1_RL1/TSGR1_69/Docs/R1-122276.zip, May 2012, pp. 1-4.
NEC Corporation: "Where to Improve Rel-12 and Beyond: Promising Technologies", 3GPP workshop Nov. 6, 2012_12_RAN_REL12, RWS-120011, URL: http://www.3gpp.org/ftp/workshop/2012-06-11_12_RAN_REL12/Docs/RWS-120011.zip, Jun. 1, 2012, 5 Pages.
NTT DOCOMO: "Views on DL RSs for Unsynchronized New Carrier", 3GPP TSG-RAN WG1#68b, R1-121465, URL: http://www.3gpp.org/ftp/tsg_ran/WG1_RL1/TSGR1_68b/Docs/R1-121465.zip, Mar. 2012, pp. 1-5.
Qualcomm Incorporated: "Link Performance of DL Control Channels and PDSCH in Presence of CRS Interference", 3GPP Draft; R1-106382, 3rd Generation Partnership Project (3GPP), Mobile Competence Centre; Sophia-Antipolis Cedex; France, vol. RAN WG1, No. Jacksonville; Nov. 15, 2010-Nov. 19, 2010, Nov. 9, 2010, 6 Pages, KP050598889, [retrieved on Nov. 9, 2010].
Ericsson, et al., "Simulation Assumptions for Intra-Frequency RRM Measurement Requirements", 3GPP TSG-RAN NG4#63 R4-122800, May 2012, 3 Pages, URL: http://www.3gpp.org/ftp/tsg_ran/WG4_Radio/TSGR4_63/Docs/R4-122800.zip.
NTT DOCOMO: "On the Need for Additional Carrier Types in Rel-11 CA", 3GPP TSG-RAN WG1#66 R1-112428, Aug. 2011, pp. 1-4, URL: http://www.3gpp.org/ftp/tsg_ran/WG1_RL1/TSGR1_66/Docs/R1-112428.zip.
Cewit., et al., "WF on Relaying Operation for LTE-A" 3GPP TSG-RAN WG1-56, Feb. 9-13, 2009, Athens, Greece; R1-091098, 2 Pages.
Vodafone., et al., "Type II Relay Frame-Work Definition", R1-091632; Seoul, Korea; Mar. 23-27, 2009, 2 Pages.

* cited by examiner

NETWORK INFORMATION FOR ASSISTING USER EQUIPMENT

CROSS-REFERENCE TO RELATED APPLICATIONS

This application is a continuation of U.S. application Ser. No. 13/920,036, entitled "NETWORK INFORMATION FOR ASSISTING USER EQUIPMENT" and filed on Jun. 17, 2013, which claims the benefit of U.S. Provisional Application Ser. No. 61/661,735, entitled "NETWORK INFORMATION FOR ASSISTING USER EQUIPMENT" and filed on Jun. 19, 2012; and a continuation-in-part of U.S. application Ser. No. 14/991,874, entitled "INTERFERENCE MITIGATION FOR DOWNLINK IN A WIRELESS COMMUNICATION SYSTEM" and filed on Jan. 8, 2016, which is a continuation of U.S. application Ser. No. 12/763,836, entitled "INTERFERENCE MITIGATION FOR DOWNLINK IN A WIRELESS COMMUNICATION SYSTEM" and filed on Apr. 20, 2010, now U.S. Pat. No. 9,264,097, which claims the benefit of U.S. Provisional Application Ser. No. 61/184,670 entitled "ENABLING DOWNLINK INTERFERENCE MITIGATION" and filed on Jun. 5, 2009, and U.S. Provisional Application Ser. No. 61/184,206 entitled "ENABLING DOWNLINK INTERFERENCE MITIGATION" and filed on Jun. 4, 2009, each of which are expressly incorporated by reference herein in their entirety.

BACKGROUND

Field

The present disclosure relates generally to communication systems, and more particularly, to network information for assisting a user equipment (UE).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a UE that acquires information regarding an interfering non-serving cell and uses the information to improve decoding of serving cell signals. The method includes receiving, from a serving evolved Node B (eNB), information that includes one or more transmission characteristics of at least one non-serving cell and performing at least one of interference cancellation, demodulation, or provides an improved channel quality indicator (CQI) based on the received information.

DETAILED DESCRIPTION

Figure 1:
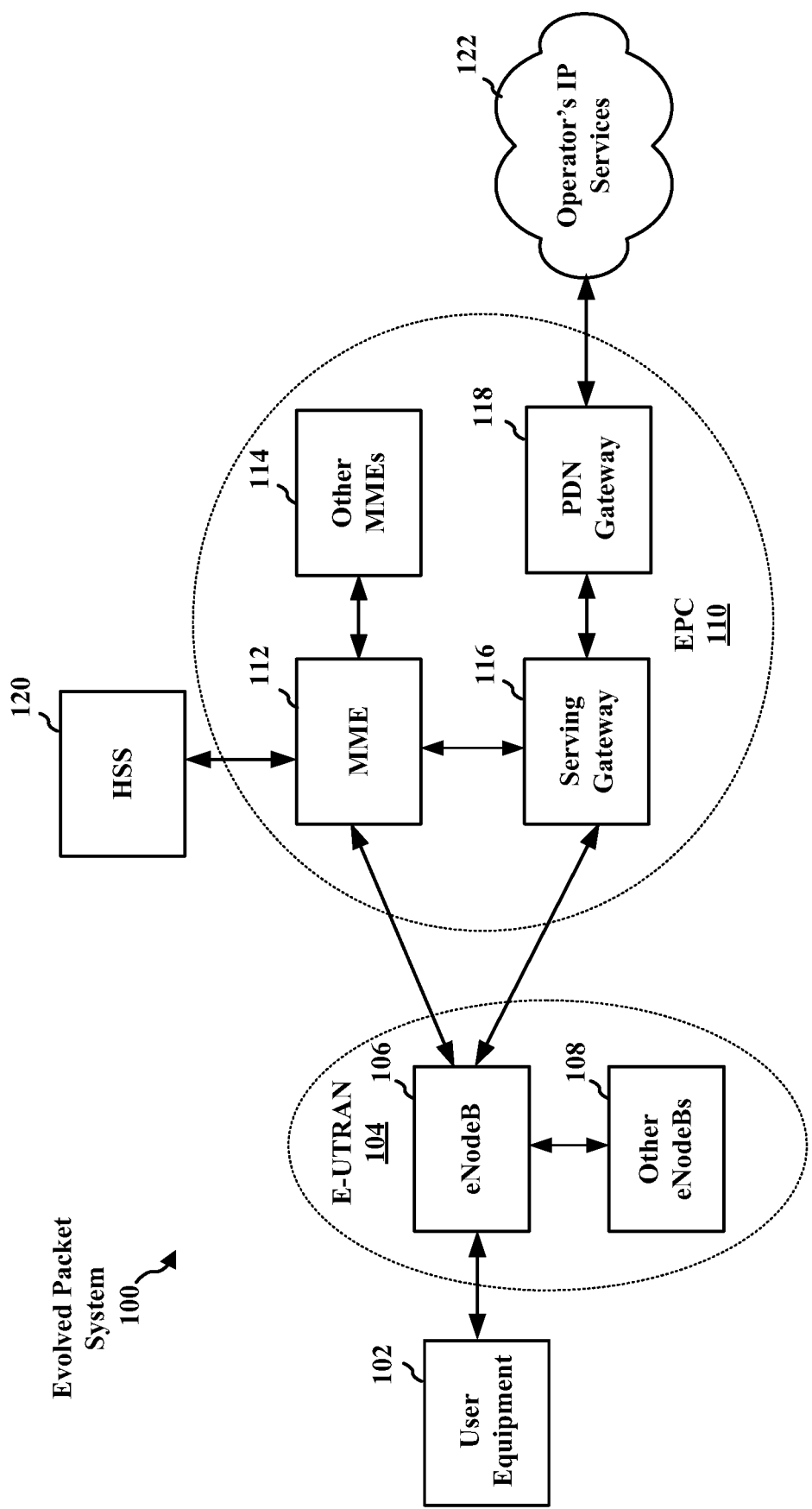
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more UE 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the eNB 106 and other eNBs 108. The eNB 106 provides user and control planes protocol terminations toward the UE 102. The eNB 106 may be connected to the other eNBs 108 via a backhaul (e.g., an X2 interface). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
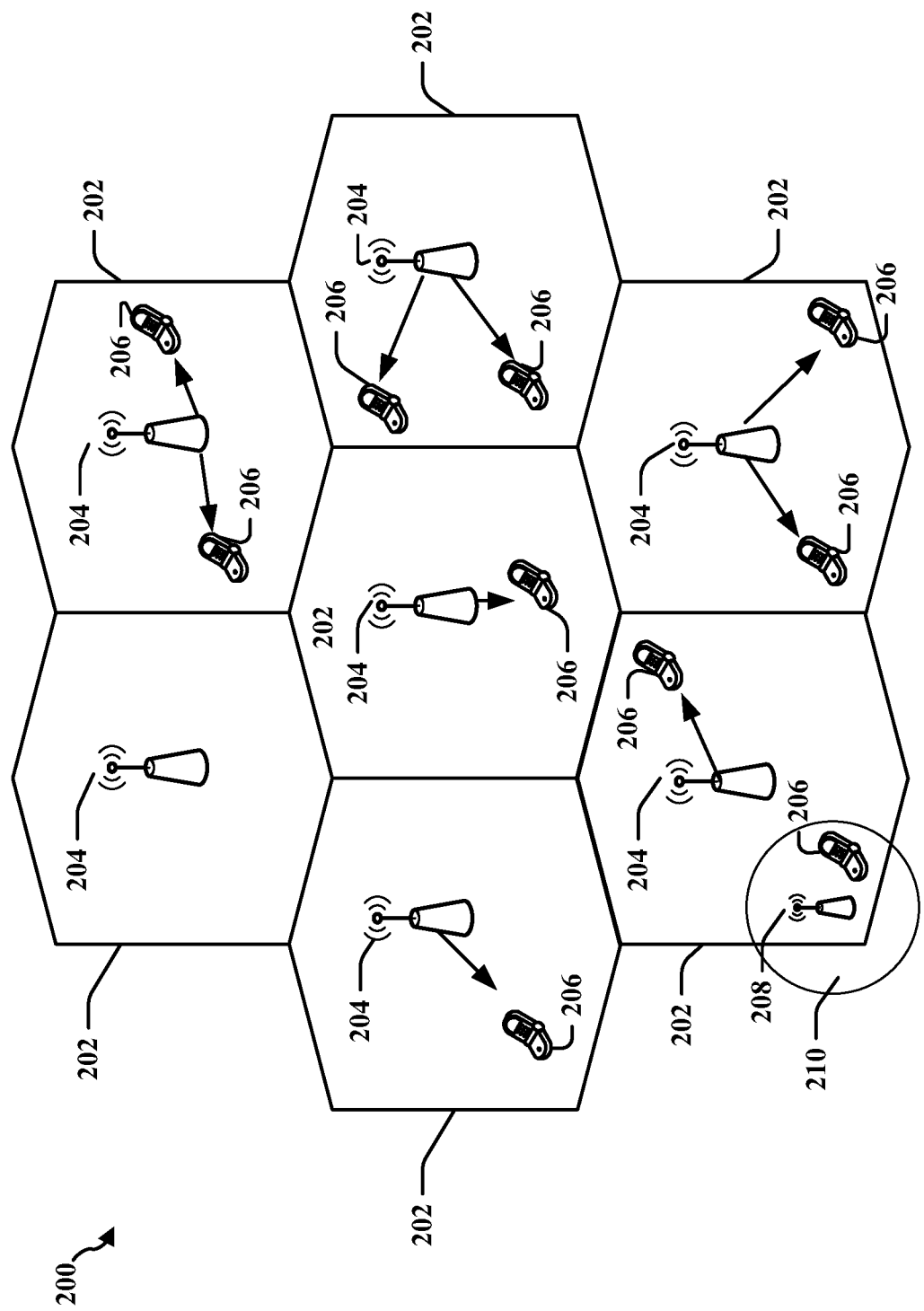
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
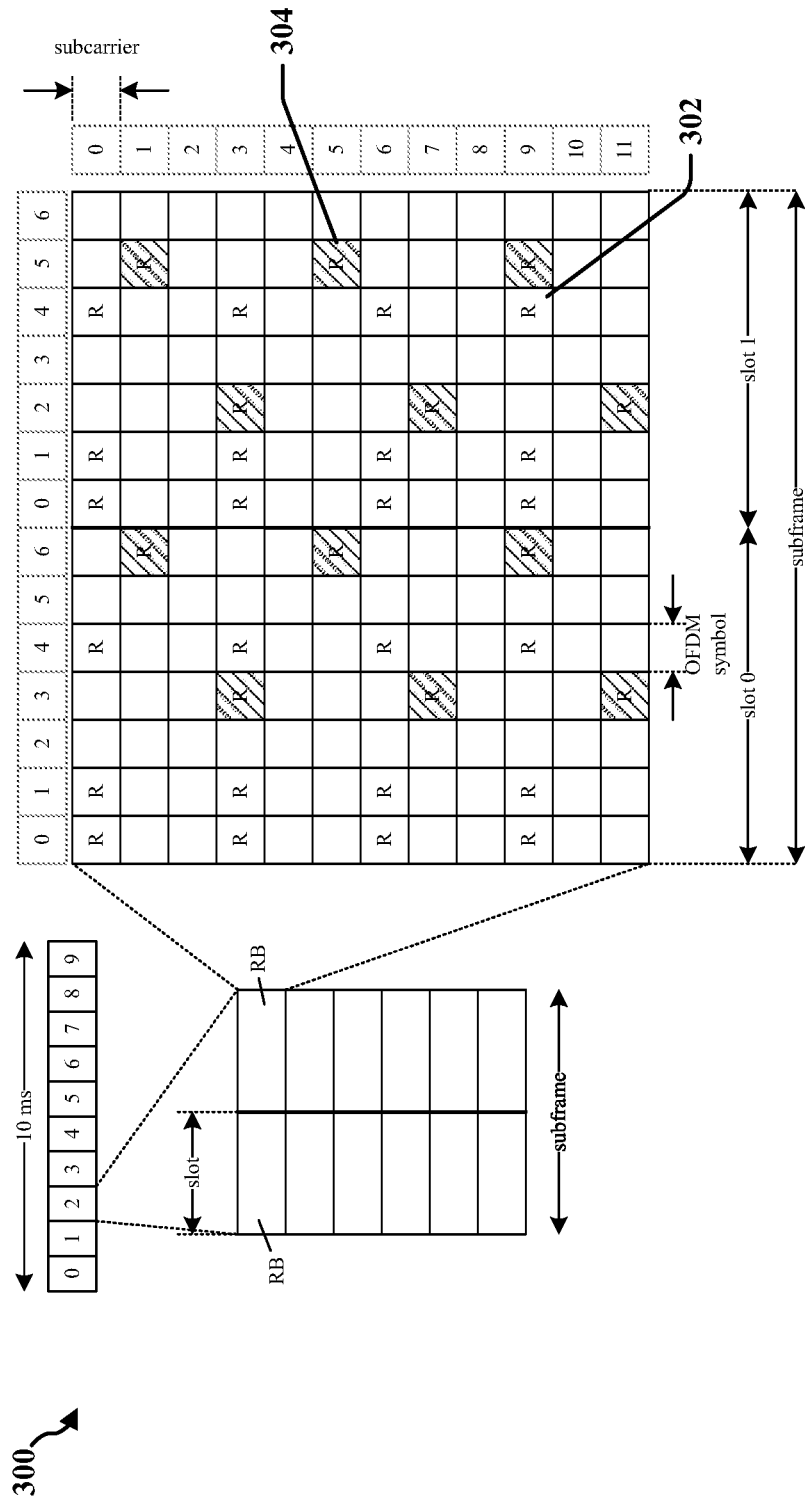
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
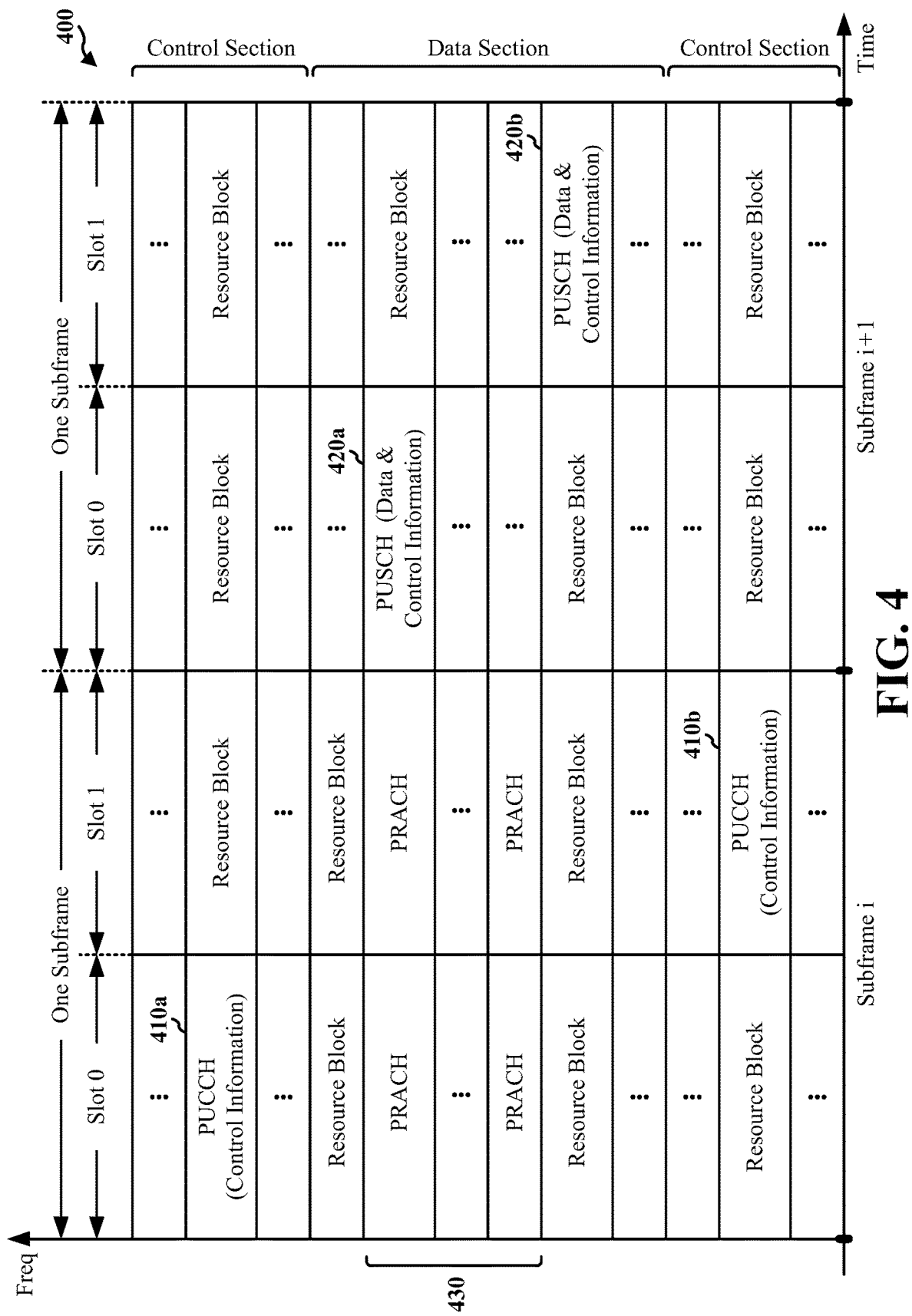
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
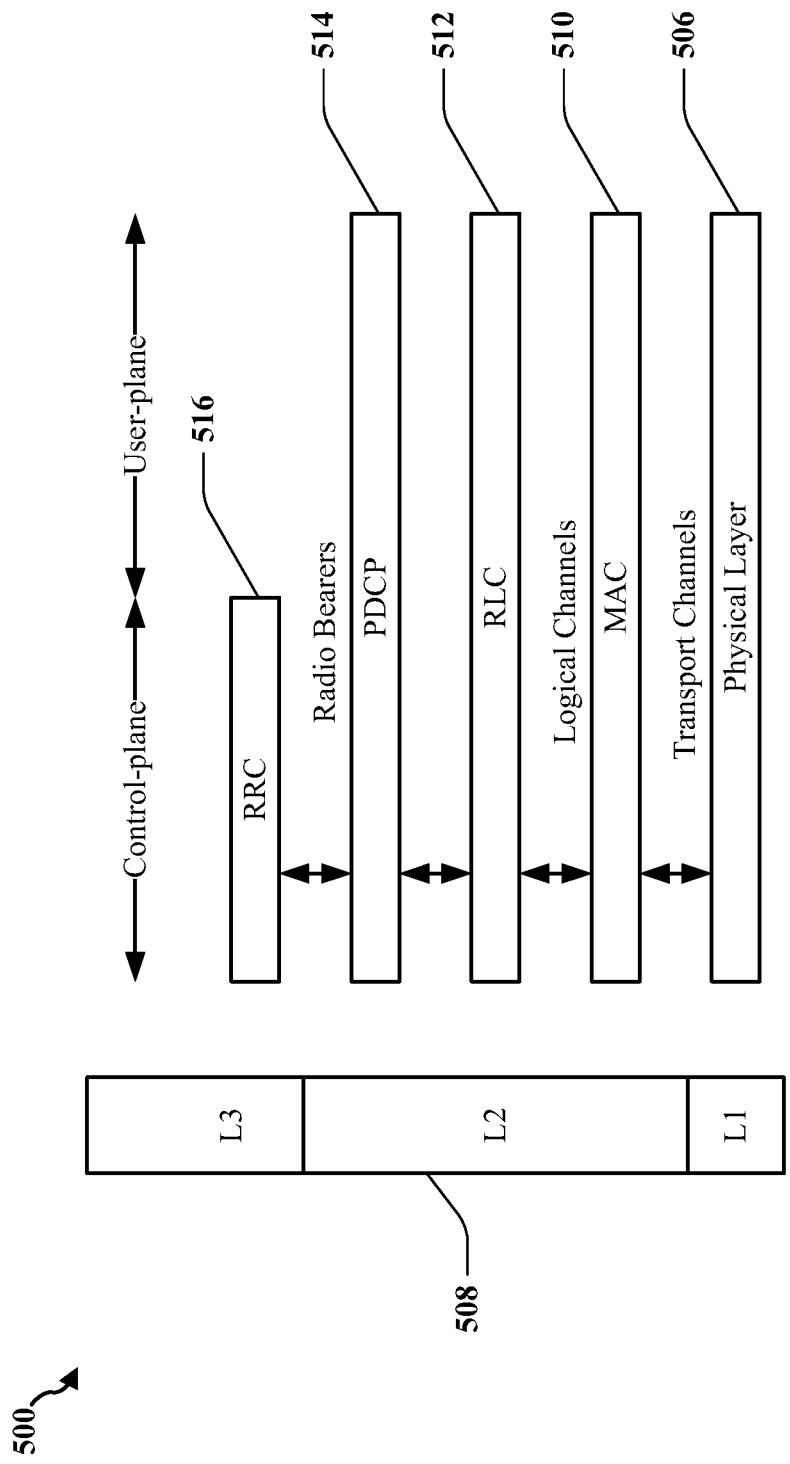
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
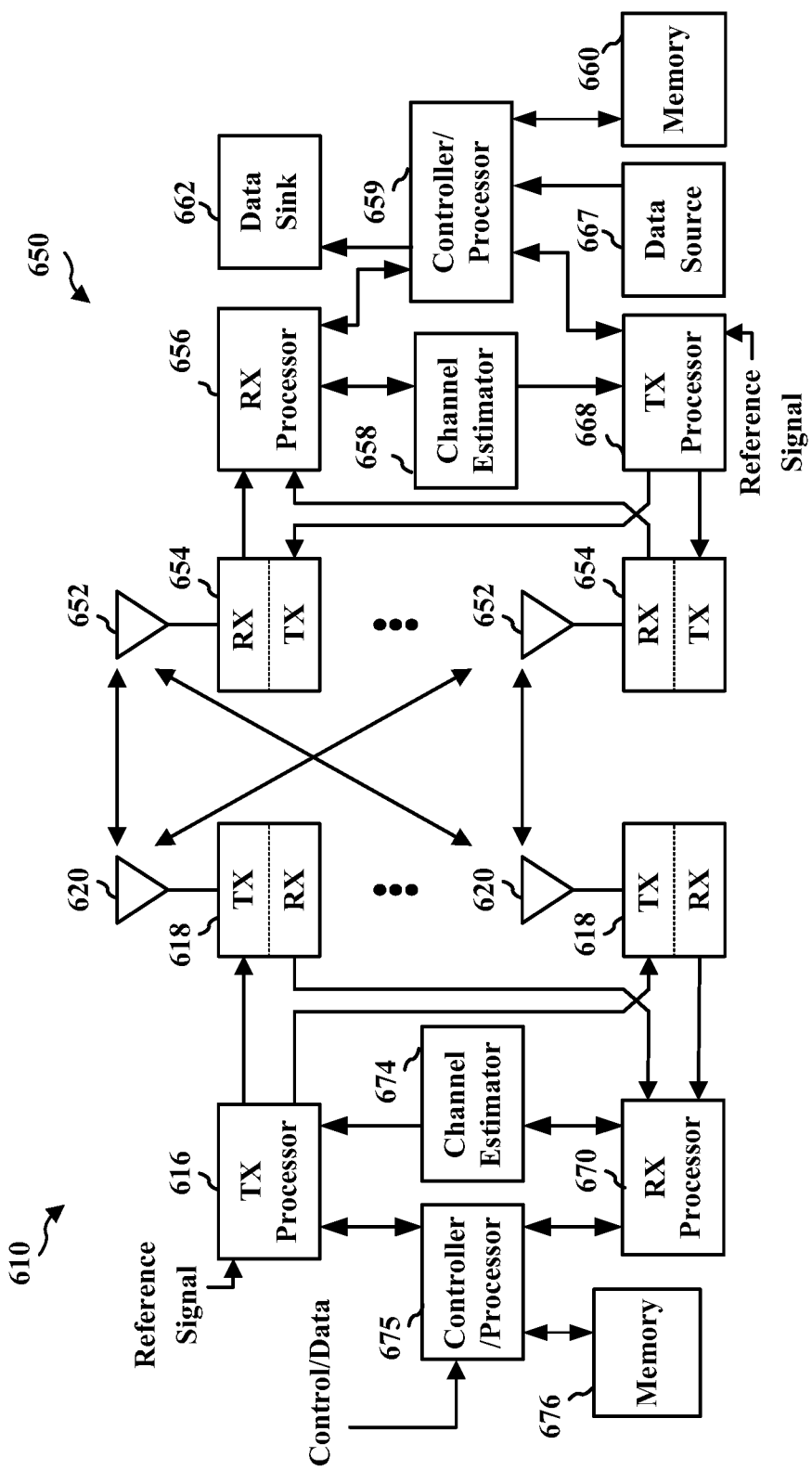
FIG. 6 is a diagram illustrating an example of an eNB and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
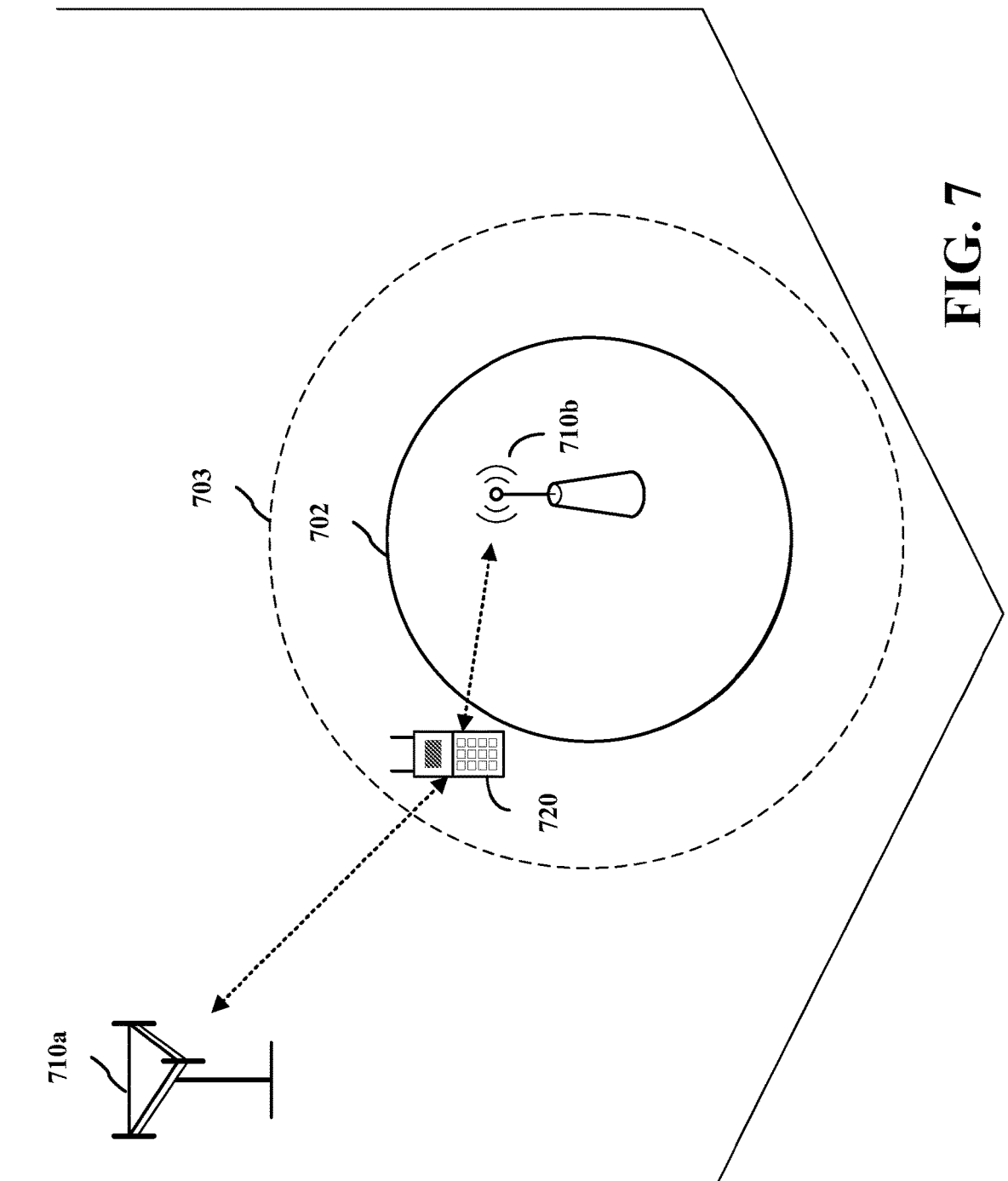
FIG. 7 is a diagram illustrating a range expanded cellular region in a heterogeneous network.

FIG. 7 is a diagram 700 illustrating a range expanded cellular region in a heterogeneous network. A lower power class eNB 710b may have a range expanded cellular region 703 that is expanded from the cellular region 702 via interference cancelation performed by the UE 720. The UE 720 may be handed off from the macro eNB 710a to the lower power class eNB 710b. The lower power class eNB 710b may be a femto cell (e.g., home eNB (HeNB)), pico cell, or a micro cell.

As discussed infra, the UE 702 is configured to receive information for enhancing the performance of the UE 702 in a heterogeneous network. The received information may include interference characteristics, relay information, information related to a new carrier type (NCT) or machine type communication (MTC), information related to multi-user multiple-input multiple-output (MU-MIMO), information related to coordinated multi-point (CoMP), mobility information, multi-flow information, multicast broadcast single frequency network (MBSFN) and/or multimedia broadcast multicast service (MBMS) configuration information, rate matching information, and/or information related to positioning reference signals (PRS). The UE 702 uses the received information to perform interference cancellation, demodulation, and/or provide an improved CQI. For example, if the UE 702 knows information related to PRS, the UE 702 may utilize the information related to PRS to detect the PRS without using a blind detector.

The interference characteristics may indicate a transmission mode (TM) of a node (e.g., an eNB) in a non-serving cell. For example, the transmission mode may be one of several transmission modes used for communication with a UE, such as "TM 1" indicating a single transmit antenna, "TM 2" indicating transmit diversity (i.e., space frequency block coding (SFBC) details for 2 antenna-ports), etc. The interference characteristics may further indicate a carrier type and/or a carrier release used by the non-serving cell. For example, the carrier type may be a legacy carrier type (LCT) and/or an NCT. For example, the carrier release may indicate a specific LTE release, such as LTE Release 8/9/10/11/12 or later. Such carrier release information may specify various information, such as the TM mode being used, channel state information reference signal (CSI-RS) information, enhanced physical downlink control channel (ePDCCH) information and other information corresponding to a specific release. For example, if the UE 702 knows the TM mode used by the eNB, the UE 702 may skip some hypotheses for unknown transmission modes.

The interference characteristics may further indicate a control span of an interferer (e.g., a number of OFDM symbols and/or a starting point of the PDSCH), typically used radio network temporary identifier (RNTI) values, an IC list, and a virtual cell identification (ID) set to narrow down the demodulation reference signal (DMRS) candidates. In one configuration, the DMRS candidates may be cell-specific. In another configuration, the DMRS candidates may be UE-specific. For example, if the UE 702 knows the virtual cell ID set, the UE 702 may search only the candidates with respect to the virtual cell ID set rather than search all possible cell IDs.

The interference characteristics may further indicate statistics regarding a loading level of almost blank subframes (ABSs) and non-ABSs, statistics regarding previously used traffic-to-pilot ratios (TPRs) (e.g., a mean TPR), a previously used TPR, a TPR variation of 16-QAM or 64-QAM, statistics regarding a previously used modulation order (e.g., a percentage of QPSK or 16-QAM), and/or a previously used modulation order or loading. For example, the statistics regarding the loading level of ABSs and non-ABSs may indicate a mean (e.g., based on the number of ABSs that are used and that are not used) and a variance.

The relay information may include loading information of a donor eNB, a resource allocation to a relay node, and/or a type of the donor eNB (e.g., a macro eNB or a pico eNB). In one aspect, a UE may implement a distributed association algorithm, such that selection of a relay node is UE centric instead of network centric. In such aspect, the UE may analyze various parameters for inferring the quality of a backhaul of the relay node, such as a parameter (e.g., "NumRX") indicating the number of receive antennas of a relay node (more generally the UE category of the relay node), backhaul geometry of the relay node, and/or relay node loading. However, such parameters for inferring the quality of a backhaul of a relay node may be subsumed into a single parameter. In one aspect, the relay node may be another UE.

The information related to NCT may indicate whether the transmissions from a node of a non-serving cell are based on the NCT or LCT. In one aspect where time division multiplexing (TDM) is used to include both the NCT and the LCT in a subframe, a TDM partition separating the NCT and LCT may be indicated to the UE to facilitate processing of the subframe. In the NCT, the CRS is not present for all subframes (e.g., CRS may be present every five subframes). Therefore, if both the NCT and the LCT are used in neighboring cells, the UE may be informed of the presence of the NCT and may avoid performing CRS interference cancelation (CRS-IC) for all subframes. Currently, the transmission mode for NCT has not been determined. Moreover, the DMRS pattern of the NCT may change to avoid collision with the primary synchronization signal (PSS) and the secondary synchronization signal (SSS).

The information related to MTC may indicate a narrow band region dedicated for MTC in order to allow the UE to apply different cancellation methods or processing. In one configuration, the transmission from the narrow band is different from a PDSCH region of a subframe.

The information related to MU-MIMO may indicate information regarding other users, such as whether other users configured for MU-MIMO are currently transmitting in a non-serving cell. The information related to CoMP may indicate a cooperation set associated with CoMP. For example, the cooperation set may indicate one or more nodes that are transmitting PDSCH to the UE. The mobility information may include tunneled non-serving cell information used by a UE for performing a handover procedure. The multi-flow information may indicate loading information of different nodes and different radio access technologies (RATs) of a multi-flow configuration.

The MBSFN and/or the MBMS configuration information may include the MBSFN and/or the MBMS configuration of a non-serving eNB in a neighboring cell. The rate matching information may include rate matching information for the PDSCH of a non-serving eNB in a neighboring cell. The PRS information may indicate the PRS implemented by a non-serving eNB in a neighboring cell.

Figure 8:
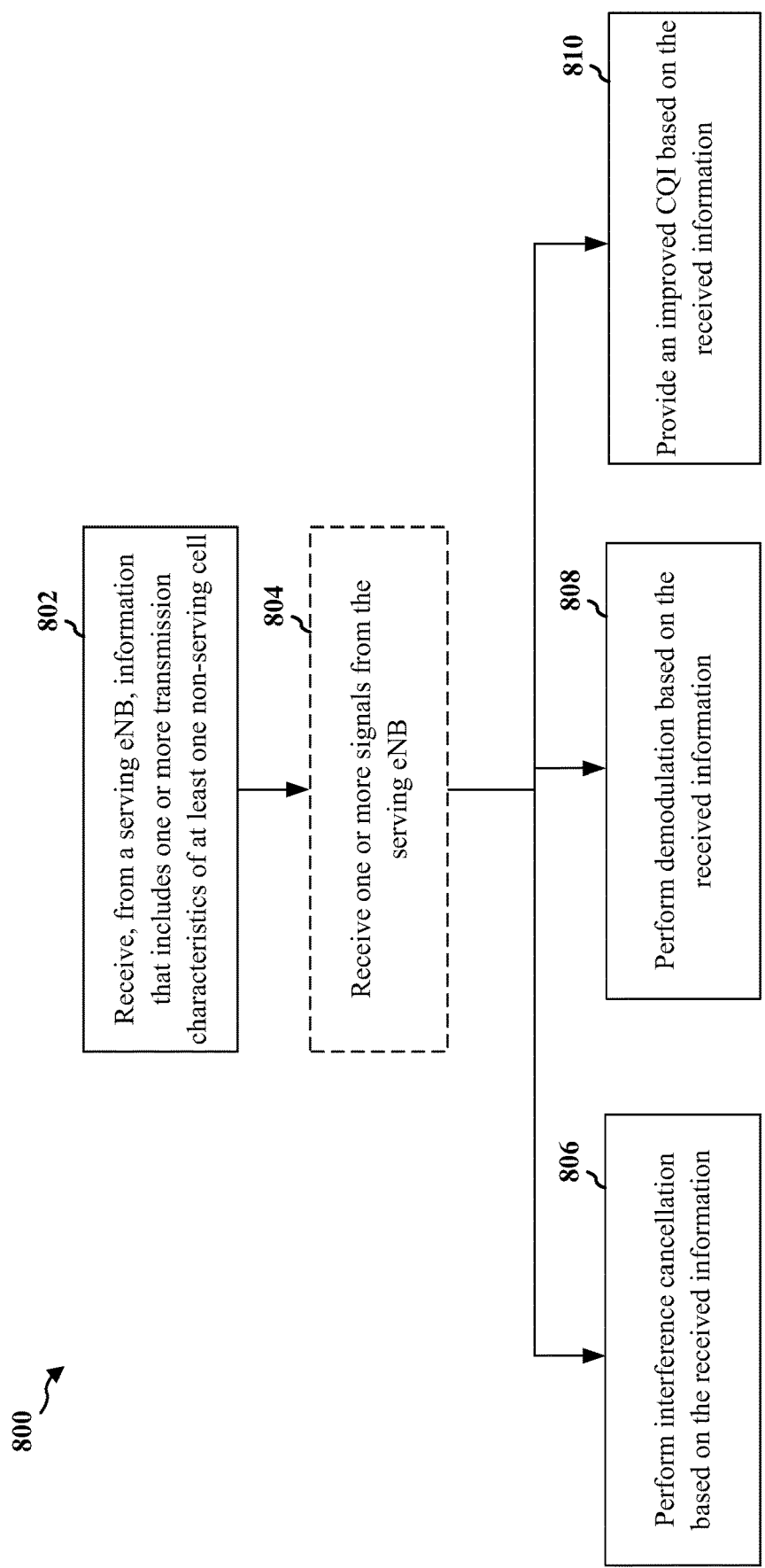
FIG. 8 is a flow chart of a method of wireless communication.

FIG. 8 is a flow chart 800 of a method of wireless communication. The method may be performed by a UE, such as UE 702, in a heterogeneous network. At step 802, the UE receives, from a serving eNB, information that includes one or more transmission characteristics of at least one non-serving cell. As described supra, the received information may include interference characteristics, relay information, information related to an NCT or MTC, information related to MU-MIMO, information related to CoMP, mobility information, multi-flow information, MBSFN and/or MBMS configuration information, rate matching information, and/or information related to PRS.

At step 804, the UE receives one or more signals from the serving eNB.

At step 806, the UE performs interference cancellation based on the received information. For example, the UE may use the interference characteristics of the at least one non-serving cell included in the received information to cancel an interference of the one or more signals from the serving eNB caused by signals from the at least one non-serving cell.

At step 808, the UE performs demodulation based on the received information. For example, the UE may use the transmission characteristics (e.g., interference characteristics) of the at least one non-serving cell included in the received information to facilitate demodulation of the one or more signals from the serving eNB.

At step 810, the UE provides an improved CQI based on the received information. For example, the UE may use the transmission characteristics (e.g., interference characteristics) of the at least one non-serving cell included in the received information to accurately determine a CQI with respect to the serving eNB. The UE may transmit the determined CQI to the serving eNB.

It should be understood that the path including steps 802, 804, and 806, the path including steps 802, 804, and 808, and the path including steps 802, 804, and 810 represent alternative mechanisms. It should be noted that any of the steps 806, 808, and 810 may be performed sequentially, in parallel, in various orders, and in various combinations.

Figure 9:
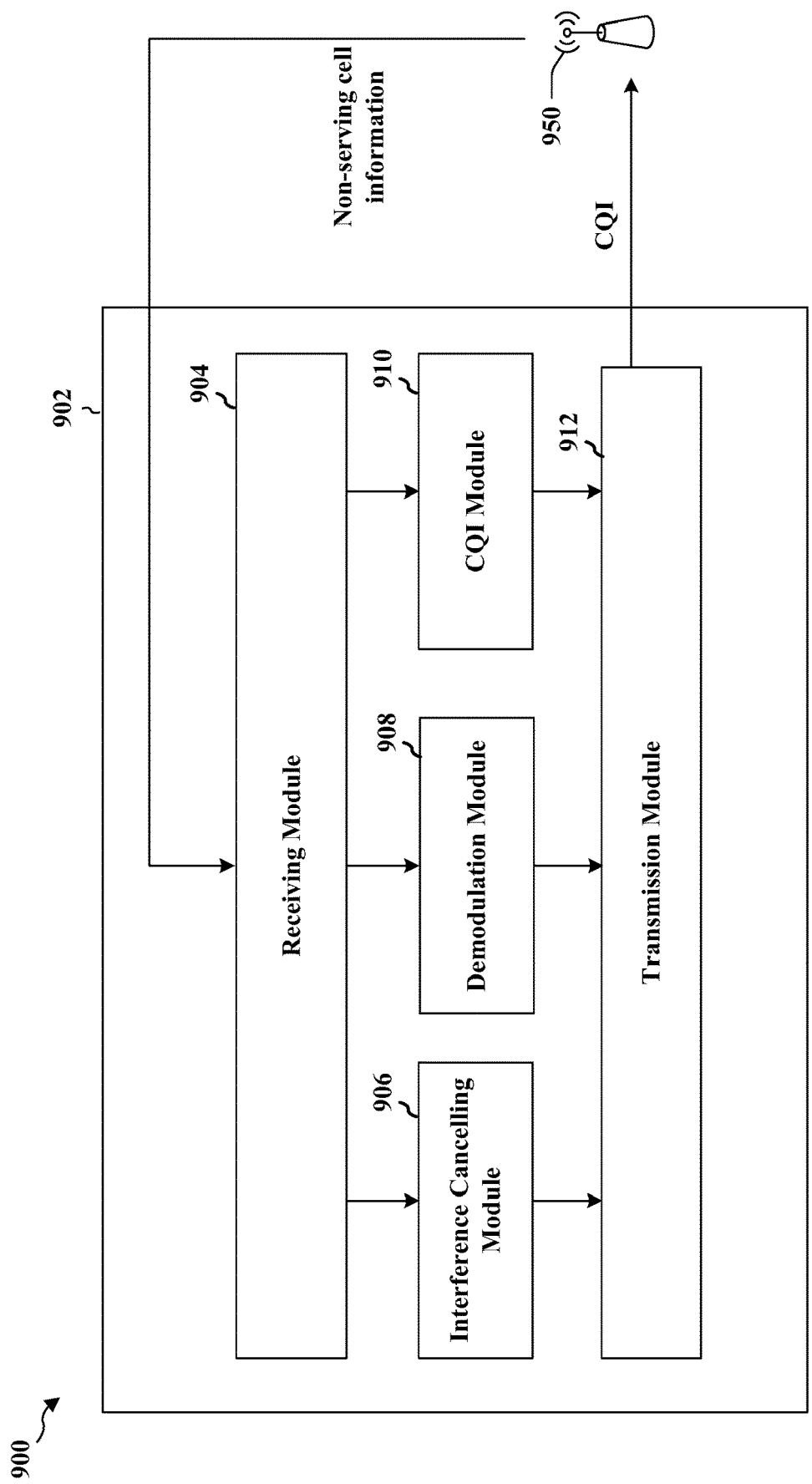
FIG. 9 is a conceptual data flow diagram illustrating the data flow between different modules/means/components in an exemplary apparatus.

FIG. 9 is a conceptual data flow diagram 900 illustrating the data flow between different modules/means/components in an exemplary apparatus 902. The apparatus may be a UE. The apparatus includes a receiving module 904 that receives, from a serving eNB 950, information that includes one or more transmission characteristics of at least one non-serving cell, an interference cancelling module 906 that performs interference cancellation using the received information, a demodulation module 908 that performs demodulation using the received information, a CQI module 910 that determines a CQI using the received information, and a transmission module 912 that transmits a CQI.

The apparatus may include additional modules that perform each of the steps of the algorithm in the aforementioned flow chart of FIG. 8. As such, each step in the aforementioned flow chart of FIG. 8 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 10:
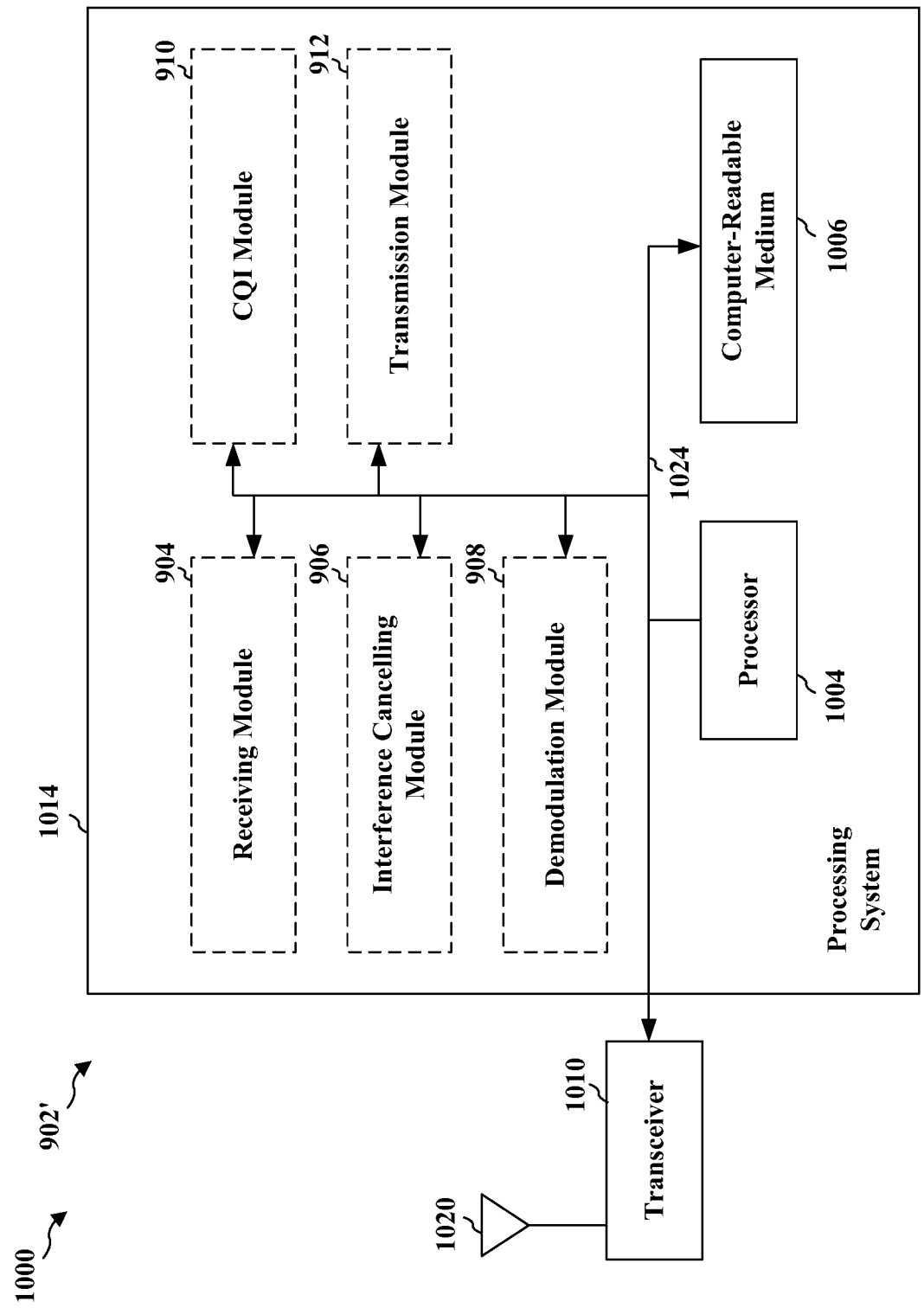
FIG. 10 is a diagram illustrating an example of a hardware implementation for an apparatus employing a processing system.

FIG. 10 is a diagram 1000 illustrating an example of a hardware implementation for an apparatus 902' employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, the modules 904, 906, 908, 910, 912 and the computer-readable medium 1006. The bus 1024 may also link various other circuits such as timing sources, peripherals, voltage regulators, and power management circuits, which are well known in the art, and therefore, will not be described any further.

The processing system 1014 may be coupled to a transceiver 1010. The transceiver 1010 is coupled to one or more antennas 1020. The transceiver 1010 provides a means for communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described supra for any particular apparatus. The computer-readable medium 1006 may also be used for storing data that is manipulated by the processor 1004 when executing software. The processing system further includes at least one of the modules 904, 906, 908, 910, and 912. The modules may be software modules running in the processor 1004, resident/stored in the computer readable medium 1006, one or more hardware modules coupled to the processor 1004, or some combination thereof. The processing system 1014 may be a component of the UE 650 and may include the memory 660 and/or at least one of the TX processor 668, the RX processor 656, and the controller/processor 659.

In one configuration, the apparatus 902/902' for wireless communication includes means for receiving, from a serving eNB, information regarding at least one non-serving cell, and means for performing at least one of interference cancellation, demodulation, or providing an improved CQI based on the received information. The aforementioned means may be one or more of the aforementioned modules of the apparatus 902 and/or the processing system 1014 of the apparatus 902' configured to perform the functions recited by the aforementioned means. As described supra, the processing system 1014 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication comprising:
receiving, from a serving base station, information comprising transmission characteristics of a signal transmitted from at least one non-serving base station, the transmission characteristics comprising a transmission mode and a traffic-to-pilot ratio (TPR) variation of the at least one non-serving base station; and
performing at least one of interference cancellation, demodulation, or providing an improved channel quality indicator (CQI) using the received transmission mode and the TPR variation of the at least one non-serving base station.

2. The method of claim 1, wherein the transmission characteristics comprises one or more interference characteristics of the signal transmitted from the at least one non-serving base station.

3. The method of claim 2, wherein the one or more interference characteristics further comprises at least one of a recently used radio network temporary identifier (RNTI) value, an interfering cell (IC) list, a carrier type, a carrier release, a virtual cell identification (ID), a control span, statistics regarding a loading level of at least one of almost blank subframes (ABSs) and non-ABSs, statistics regarding previously used traffic-to-pilot ratios (TPRs), a previously used TPR, statistics regarding a previously used modulation order, and the previously used modulation order.

4. The method of claim 1, wherein:
the information further comprises one or more characteristics of a relay node; and
the at least one non-serving base station is a donor base station.

5. The method of claim 4, wherein the one or more characteristics of the relay node comprises at least one of a type of the donor base station, loading information of the donor base station, a resource allocation to the relay node, and a parameter indicating a backhaul quality of the relay node.

6. The method of claim 1, wherein the information indicates whether subframes from the at least one non-serving base station are based on a legacy carrier type (LCT), a new carrier type (NCT), or the LCT and the NCT.

7. The method of claim 1, wherein the information indicates a narrowband region dedicated for machine type communication (MTC).

8. The method of claim 1, wherein the information indicates a time division multiplexing (TDM) partition between a new carrier type (NCT) and a legacy carrier type (LCT) in a subframe transmitted from the at least one non-serving base station.

9. The method of claim 1; wherein the information indicates whether a node configured for multi-user multiple-input multiple-output (MU-MIMO) is currently transmitting.

10. The method of claim 1, wherein the information indicates a cooperation set associated with a coordinated multi-point (COMP) configuration.

11. The method of claim 1, wherein the information further comprises tunneled non-serving base station information used for performing a handover procedure.

12. The method of claim 1, wherein the information indicates loading information of different nodes and different radio access technologies (RATs) of a multi-flow configuration.

13. The method of claim 1, wherein the information indicates at least one of a multicast broadcast single frequency network (MBSFN) configuration of the at least one non-serving base station and a multimedia broadcast multi cast service (MBMS) configuration of the at least one non-serving base station.

14. The method of claim 1, wherein the information indicates matching information for a physical downlink shared channel (PDSCH).

15. The method of claim 1, wherein the information indicates the TPR variation of one of quadrature phase-shift keying (QPSK), 16-quadrature amplitude modulation (QAM), or 64-QAM.

16. The method of claim 1, wherein the information indicates a configuration of positioning reference signals (PRS) implemented by the at least one non-serving base station.

17. The method of claim 1, wherein the transmission mode of the at least one non-serving base station indicates whether the signal transmitted from the at least one non-serving base station is transmitted with a single transmit antenna or transmit diversity.

18. An apparatus for wireless communication; comprising:
means for receiving, from a serving base station, information comprising transmission characteristics of a signal transmitted from at least one non-serving base station, the transmission characteristics comprising a transmission mode and a traffic-to-pilot ratio (TPR) variation of the at least one non-serving base station; and
means for performing at least one of interference cancellation, demodulation; or providing an improved channel quality indicator (CQI) using the received transmission mode and the TPR variation of the at least one non-serving base station.

19. The apparatus of claim 18, wherein the transmission characteristics comprises one or more interference characteristics of the signal transmitted from the at least one non-serving base station.

20. The apparatus of claim 19, wherein the one or more interference characteristics further comprises at least one of a recently used radio network temporary identifier (RNTI) value, an interfering cell (IC) list, a carrier type, a carrier release, a virtual cell identification (ID), a control span, statistics regarding a loading level of at least one of almost blank subframes (ABSs) and non-ABSs, statistics regarding previously used traffic-to-pilot ratios (TPRs), a previously used TPR, statistics regarding a previously used modulation order, and the previously used modulation order.

21. The apparatus of claim 18, wherein:
the information further comprises one or more characteristics of a relay node; and
the at least one non-serving base station is a donor base station.

22. The apparatus of claim 21, wherein the one or more characteristics of the relay node comprises at least one of a type of the donor base station, loading information of the donor base station, a resource allocation to the relay node, and a parameter indicating a backhaul quality of the relay node.

23. The apparatus of claim 18, wherein the information indicates whether subframes from the at least one non-serving base station are based on a legacy carrier type (LCT), a new carrier type (NCT), or the LCT and the NCT.

24. The apparatus of claim 18, wherein the information indicates a narrowband region dedicated for machine type communication (MTC).

25. The apparatus of claim 18, wherein the information indicates a time division multiplexing (TDM) partition between a new carrier type (NCT) and a legacy carrier type (LCT) in a subframe transmitted from the at least one non-serving base station.

26. The apparatus of claim 18, wherein the information indicates whether a node configured for multi-user multiple-input multiple-output (MU-MIMO) is currently transmitting.

27. The apparatus of claim 18, wherein the information indicates a cooperation set associated with a coordinated multi-point (CoMP) configuration.

28. The apparatus of claim 18, wherein the information further comprises tunneled non-serving base station information used for performing a handover procedure.

29. The apparatus of claim 18, wherein the information indicates loading information of different nodes and different radio access technologies (RATs) of a multi-flow configuration.

30. The apparatus of claim 18, wherein the information indicates at least one of a multicast broadcast single frequency network (MBSFN) configuration of the at least one non-serving base station and a multimedia broadcast multicast service (MBMS) configuration of the at least one non-serving base station.

31. The apparatus of claim 18, wherein the information indicates rate matching information for a physical downlink shared channel (PDSCH).

32. The apparatus of claim 18, wherein the information indicates the TPR variation of one of quadrature phase-shift keying (QPSK), 16-quadrature amplitude modulation (QAM), or 64-QAM.

33. The apparatus of claim 18, wherein the information indicates a configuration of positioning reference signals (PRS) implemented by the at least one non-serving base station.

34. An apparatus for wireless communication, comprising:
a memory; and
at least one processor coupled to the memory and configured to:
receive, from a serving base station, information comprising transmission characteristics of a signal transmitted from at least one non-serving base station, the transmission characteristics comprising a transmission mode and a traffic-to-pilot ratio (TPR) variation of the at least one non-serving base station; and
perform at least one of interference cancellation, demodulation, or providing an improved channel quality indicator (CQI) using the received transmission mode and the TPR variation of the at least one non-serving base station.

35. The apparatus of claim 34, wherein the transmission characteristics comprises one or more interference characteristics of the signal transmitted from the at least one non-serving base station.

36. The apparatus of claim 35, wherein the one or more interference characteristics further comprises at least one of a recently used radio network temporary identifier (RNTI) value; an interfering cell (IC), a carrier type, a carrier release, a virtual cell identification (ID), a control span, statistics regarding a loading level of at least one of almost blank subframes (ABSs) and non-ABSs, statistics regarding previously used traffic-to-pilot ratios (TPRs), a previously used TPR, statistics regarding a previously used modulation order, and the previously used modulation order.

37. The apparatus of claim 34, wherein:
the information further comprises one or more characteristics of a relay node; and
the at least one non-serving base station is a donor base station.

38. The apparatus of claim 37, wherein the one or more characteristics of the relay node comprises at least one of a type of the donor base station, loading information of the donor base station, a resource allocation to the relay node, and a parameter indicating a backhaul quality of the relay node.

39. The apparatus of claim 34, wherein the information indicates whether subframes from the at least one non-serving base station are based on a legacy carrier type (LCT), a new carrier type (NCT), or the LCT and the NCT.

40. The apparatus of claim 34, wherein the information indicates a narrowband region dedicated for machine type communication (MTC).

41. The apparatus of claim 34, wherein the information indicates a time division multiplexing (TDM) partition between a new carrier type (NCT) and a legacy carrier type (LCT) in a subframe transmitted from the at least one non-serving base station.

42. The apparatus of claim 34, wherein the information indicates whether a node configured for multi-user multiple-input multiple-output (MU-MIMO) is currently transmitting.

43. The apparatus of claim 34, wherein the information indicates a cooperation set associated with a coordinated multi-point (COMP) configuration.

44. The apparatus of claim 34, wherein the information further comprises tunneled non-serving base station information used for performing a handover procedure.

45. The apparatus of claim 34, wherein the information indicates loading information of different nodes and different radio access technologies (RATS) of a multi-flow configuration.

46. The apparatus of claim 34, wherein the information indicates at least one of a multicast broadcast single frequency network (MBSFN) configuration of the at least one non-serving base station and a multimedia broadcast multicast service (MBMS) configuration of the at least one non-serving base station.

47. The apparatus of claim 34, wherein the information indicates rate matching information for a physical downlink shared channel (PDSCH).

48. The apparatus of claim 34, wherein the information indicates the TPR variation of one of quadrature phase-shift keying (QPSK), 16-quadrature amplitude modulation (QAM) or 64-QAM.

49. The apparatus of claim 34, wherein the information indicates a configuration of positioning reference signals (PRS) implemented by the at least one non-serving base station.

50. A non-transitory computer-readable medium storing computer-executable code, comprising code to:
receive, from a serving base station, information comprising transmission characteristics of a signal transmitted from at least one non-serving base station; the transmission characteristics comprising a transmission mode and a traffic-to-pilot ratio (TPR) variation of the at least one non-serving base station; and
perform at least one of interference cancellation, demodulation, or providing an improved channel quality indicator (CQI) using the received transmission mode and the TPR variation of the at least one non-serving base station.

51. The non-transitory computer-readable medium of claim 50, wherein the transmission characteristics comprises one or more interference characteristics of the signal transmitted from the at least one non-serving base station.

52. The non-transitory computer-readable medium of claim 51, wherein the one or more interference characteristics further comprises at least one a recently used radio network temporary identifier (RNTI) value, an interfering cell (IC), a carrier type, a carrier release, a virtual cell identification (ID), a control span, statistics regarding a loading level of at least one of almost blank subframes (ABSs) and non-ABSs; statistics regarding previously, used traffic-to-pilot ratios (TPRs); a previously used TPR, statistics regarding a previously used modulation order, and all the previously used modulation order.

53. The non-transitory computer-readable medium of claim 50, wherein the information indicates the TPR variation of one of quadrature phase-shift keying (QPSK), 16-quadrature amplitude modulation (QAM) or 64-QAM.

\* \* \* \* \*